June 17, 1941.   P. W. KANE   2,246,444
AUTOMATIC VARIABLE SPEED TRANSMISSION MECHANISM
Filed Jan. 29, 1940   3 Sheets-Sheet 1

Inventor
Peter W. Kane.
By
Attorney

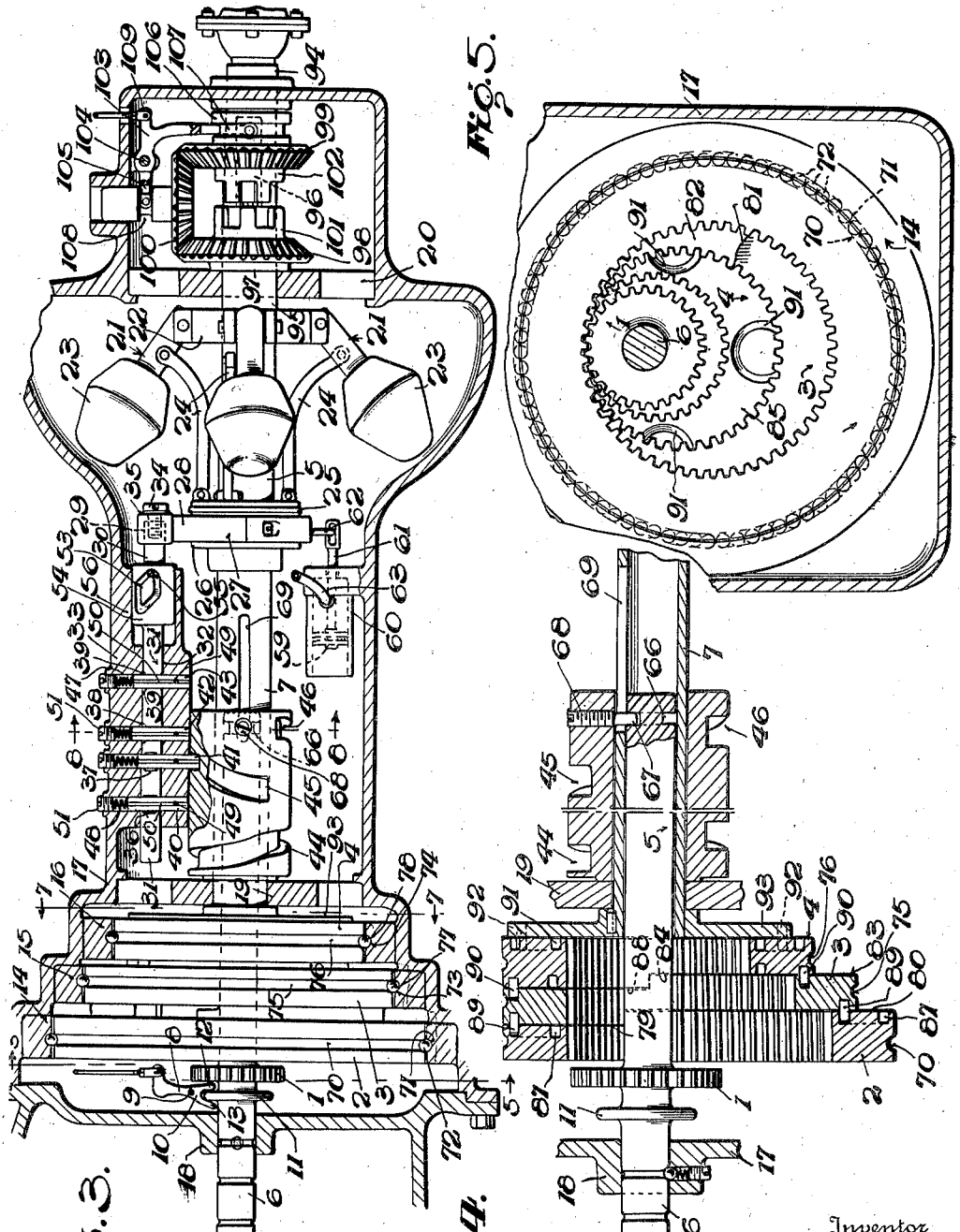

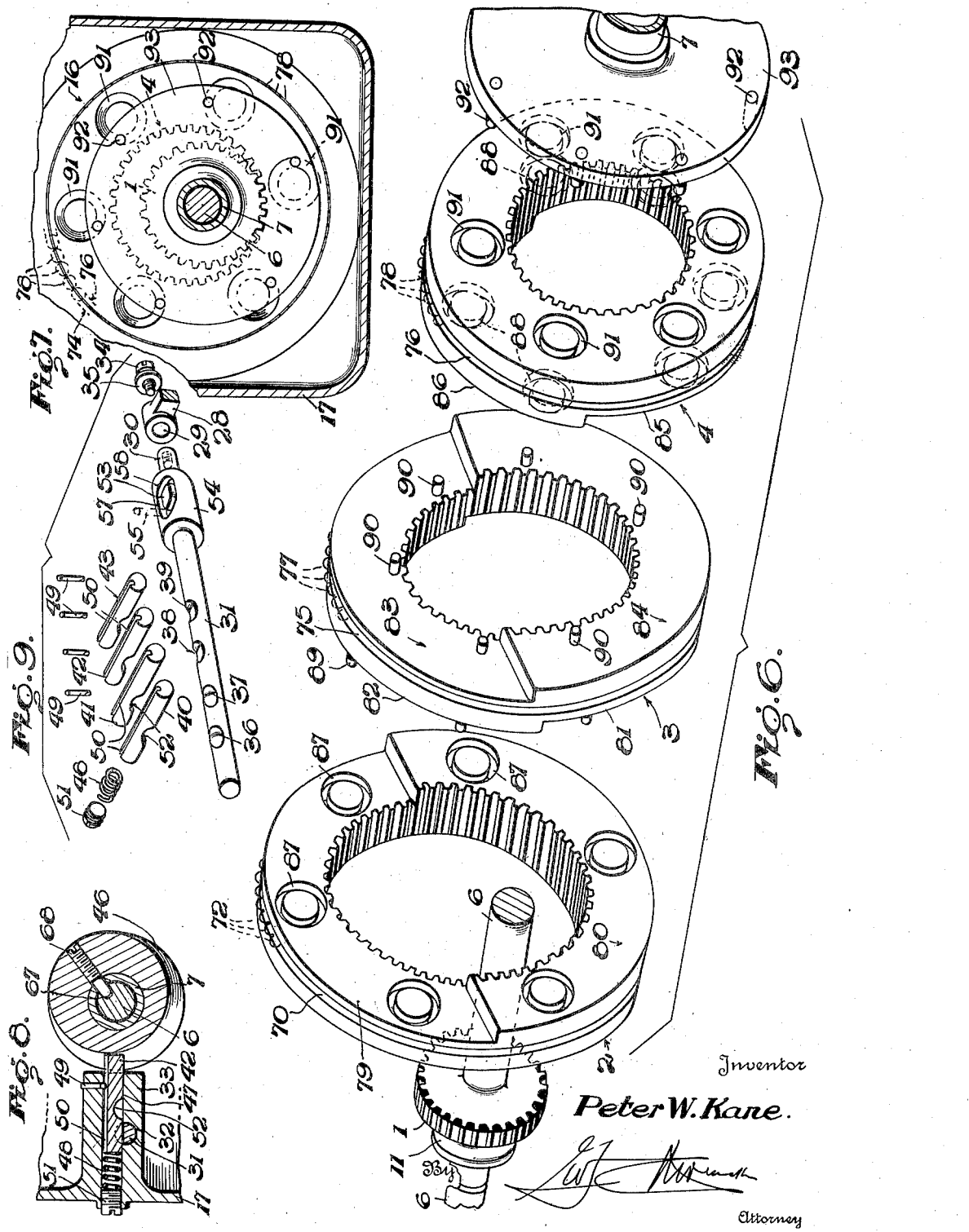

Patented June 17, 1941

2,246,444

UNITED STATES PATENT OFFICE 2,246,444

AUTOMATIC VARIABLE SPEED TRANSMISSION MECHANISM

Peter W. Kane, Rochester, N. Y., assignor of one-third to Joseph B. Barnes, Milford, Conn.

Application January 29, 1940, Serial No. 316,261

11 Claims. (Cl. 74—336.5)

This invention relates to an automatic variable speed transmission mechanism.

An object of the present invention is to provide a simple, strong, and comparatively inexpensive automatic variable speed transmission mechanism for automobiles and other motor vehicles adapted to be manually thrown into and out of operation and capable, after being placed in operation, of being automatically operated and controlled by the speed of the vehicle, through the action of a centrifugal governor, to shift from low speed to second speed and from second speed to high and back to second speed and low speed without any manual operation of the transmission mechanism and without operating the clutch of the vehicle, it being only necessary to unclutch the engine when throwing the transmission to neutral or out of operation and to change from neutral to operative position of the mechanism.

Another object of the invention is to equip the transmission mechanism with a suction- or vacuum-actuated piston connected with the suction created in the intake manifold of the vehicle and adapted during normal operation of a machine to assist the governor in actuating the transmission mechanism in shifting from one speed to another, so that, if for any reason it be desired to continue driving at a speed to which the transmission mechanism has been shifted, the governor may be left unassisted by the piston and will be temporarily unable to actuate the shifting mechanism. As the governor is assisted in its action by the suction-operated piston in the normal operation of the motor vehicle, both the governor and the piston are required to shift the mechanism from one speed to another, and if the operation of the piston is temporarily eliminated, the transmission mechanism will remain in the position to which it has been shifted until the speed of the vehicle is sufficient to increase the centrifugal force of the governor to an extent to operate the mechanism without the assistance of the piston. This will enable a car to be driven with the mechanism in low speed or in second speed a considerable distance and at an increasing velocity until the governor, through its centrifugal action, has attained sufficient force to operate the mechanism. The piston is not absolutely necessary to the operation of the transmission by the governor, as the velocity of the car will eventually cause the centrifugal force of the governor to increase to such an extent that the governor will of itself operate the transmission. The two operating forces are employed to delay action of the governor when desired or required in the normal operation of the car, and it renders the transmission mechanism more flexible in the control of a car.

With these and other objects in view, the invention consists in the construction and novel combination and arrangement of parts hereinafter fully described, illustrated in the accompanying drawings and pointed out in the claims hereto appended, it being understood that various changes in the form, proportions and minor details of construction may be resorted to without departing from the spirit or sacrificing any of the advantages of the invention.

In the drawings:

Figure 3 is a reverse plan view of the same.

Figure 4 is a longitudinal sectional view through the transmission mechanism.

Figure 5 is a transverse sectional view taken substantially on the line 5—5 of Figure 3.

Figure 6 is an exploded view of the gearing of the automatic variable speed transmission mechanism.

Figure 7 is a transverse sectional view taken substantially on the line 7—7 of Figure 3.

Figure 8 is a detail sectional view taken substantially on the line 8—8 of Figure 3.

Figure 9 is an exploded view of the governor-actuated operating rod and the cam engaging pinion which are controlled by the operating rod.

Figures 1, 2:
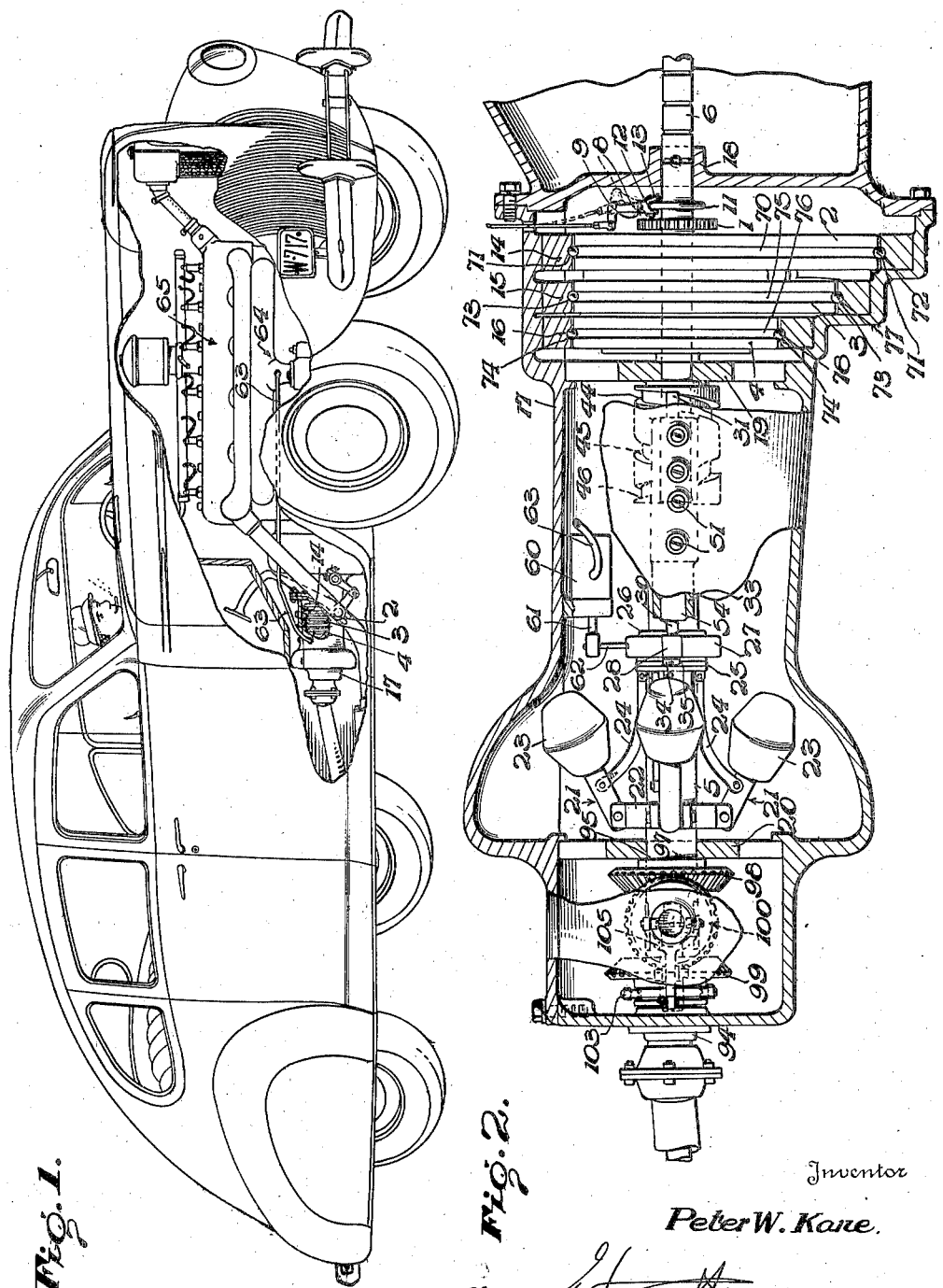
Figure 1 is a perspective view of an automobile equipped with an automatic variable speed mechanism constructed in accordance with this invention, a portion of the hood and body of the automobile being broken away to show the automatic variable speed transmission mechanism.
Figure 2 is an enlarged side elevation of the automatic variable speed transmission mechanism.

In the accompanying drawings in which is illustrated a preferred embodiment of the invention, the variable speed transmission mechanism comprises in its construction a shiftable pinion 1 and low speed, second speed, and high speed gears 2, 3 and 4 having internal teeth of the same pitch and size as the teeth of the shiftable pinion 1 and coupled or connected together one with another and with a driven shaft 5 and adapted to mesh with the pinion 1, which is mounted on a drive shaft 6, so that when the pinion 1 is shifted into mesh with one of the said gears, motion will be transmitted to the driven shaft from the drive shaft at a speed proportional to the diameter of the pinion and the gear with which it meshes.

The driven shaft 5 is provided with a tubular front portion 7, into which the rear portion of the drive shaft 6 telescopes, as clearly illustrated in Figure 4 of the drawings, and the front end of the drive shaft 6 is connected with the shaft of the engine by a clutch (not shown) of the ordinary construction, which is adapted to permit the drive shaft 6 to be shifted longitudinally to carry the pinion into and out of a neutral position and into mesh with the gears 2, 3 and 4.

The pinion is illustrated in neutral position in Figure 4 of the drawings, and when it is desired to throw the transmission mechanism into operation or condition for automatic operation, the clutch is operated to unclutch the drive shaft 6 from the engine and the drive shaft may then be moved longitudinally in a rearward direction to carry the pinion 1 into mesh with the low speed gear 2 by means of a shifting lever 8 fulcrumed at an intermediate point at 9 and having a forked arm 10 which straddles a collar 11 mounted on the drive shaft 6, but an annular rib or any other equivalent means may be employed for cooperating with the forked arm of the shifting lever. The side 12 of the forked arm 10 of the shifting lever is shorter than the side 13, so that, when the shifting lever is moved to the dotted line position illustrated in Figure 3 of the drawings, the pinion 1 will be carried rearwardly into mesh with the low speed gear 2 and the forked arm 10 will clear itself from the coacting collar 11 so as not to interfere with further rearward movement of the pinion 1 and the drive shaft 6. The shifting lever may be operated by any suitable means which may conveniently extend to the supporting column of the steering wheel. As any suitable operating mechanism for shifting the lever 8 may be provided, illustration thereof is deemed unnecessary. The collar 11 is preferably rounded transversely as shown, in order to assist the forked arm of the shifting lever to disengage itself from the collar and to reengage itself with the same.

The gear wheels 2, 3 and 4 are mounted in annular bearings 14, 15 and 16 of a housing or casing 17, which is provided in its front portion with the said bearings 14, 15 and 16 and also with suitable supports 18, 19 and 20 in which the driving and driven shafts are journaled. A centrifugal governor 21 of any suitable construction is mounted on the driven shaft. The governor, as illustrated in the drawings, consists of a hub 22 fixed to the shaft and a plurality of weighted arms 23 pivotally mounted on the hub and connected by rods 24 with a sliding sleeve 25. The sliding sleeve, which rotates with the governor and the driven shaft, is provided in its periphery with an annular groove 26 in which is mounted a collar or band 27.

The collar 27 is provided with a laterally extending arm 28 having an opening 29 through which passes the reduced end 30 of an operating rod 31 arranged in parallelism with the driven shaft and slidably mounted in a longitudinal opening 32 of a guide 33. The reduced rear end 30 of the operating rod 31 is secured in the opening 29 of the arm 28 of the collar 27 by a screw 34 threaded into the reduced end 30 and provided with a washer 35 which is interposed between the head of the screw and the adjacent side of the arm 28. The opening 29 and the reduced end 30 of the operating rod are cylindrical to permit rotary movement of the operating rod to carry notches 36, 37, 38 and 39 into position to permit spring-actuated pins 40, 41, 42 and 43 to engage spiral grooves 44 and 45 of a cam 46 which is connected with the pinion 1 and which in the automatic operation of the variable speed transmission mechanism shifts the pinion 1 from one gear to another.

The guide 33, which may consist of a block or casing of any suitable construction, is provided with a plurality of transverse openings 47 extending entirely through the block and receiving the pins 40, 41, 42 and 43 and adapted, when the operating rod is in proper position, to permit the pinion to be actuated by coiled springs 48 and moved into engagement with one or the other of the cam grooves 44 and 45. The operating rod is round and the notches 36, 37, 38 and 39 are segmental to receive portions of the spring-actuated pins 40, 41, 42 and 43, which are also round but which are held against rotary movement by means of projections formed by pins 49 or other suitable fastening devices which are mounted in the guide 33 and which extend into the transverse openings 47 thereof and engage longitudinal grooves 50 in the pins 40, 41, 42 and 43. The coiled springs, which are located in the outer ends of the transverse openings 47, are interposed between threaded plugs 51 and the outer ends of the cam engaging pins 40, 41, 42 and 43.

The notches of the operating rod are arranged in pairs, the notches 36 and 37 constituting one pair and the notches 38 and 39 constituting another pair. The notches are brought into register or alignment with the pins successively or individually and are arranged so that it is possible for only one of the cam engaging pins to project into one or the other of the cam grooves. The two pairs of notches are spaced circumferentially from each one on the operating rod 31, so that, when the notches of one pair are in position to be moved into register with their respective cam engaging pins, the other pair of notches will be turned from such position and will lock the other pair of cam engaging pins against outward movement. In order to permit only one pin of a pair to engage the cam at one and the same time, the notches of each pair are spaced apart a distance less than the distance between the cam engaging pins, so that, when the notch 36 of the operating rod has been moved into position to coincide with the pin 40, the notch 37 will be out of register with its cooperating pin 41 and it will be necessary to move the operating rod a short distance longitudinally to bring the notch 37 into register with its cooperating pin 41. The cam engaging pin 40, by reason of the notch 36 being in proper position to permit it to engage the cam, will extend into the cam groove 44 and will, through the spiral arrangement of said cam groove 44, cause the cam to move longitudinally of the transmission mechanism and carry with it the pinion 1.

The cam grooves 44 and 45 of the cam 46 are reversely disposed, one being a right-hand spiral and the other a left-hand spiral. The ends of the spiral grooves taper in depth, so that, after the pin 40 has performed its function, the cam, through its rotary movement, will carry the trailing end of the groove away from the pin, and the leading end of such spiral groove will be in position to be engaged by the second cam engaging pin 41. The movement of the cam longitudinally of the transmission mechanism, under the influence of the pin 40, carries the pinion 1 from the low speed gear to the second speed gear, and when the speed of the motor vehicle increases sufficiently to cause the centrifugal governor to further actuate the operating rod 31, it will cause sufficient longitudinal movement of the operating rod to bring the next notch 37 into position to permit the cam engaging pin 41 to project into the leading end of the groove 44 and cause a further longitudinal movement of the cam, which will carry the pinion 1 from the second speed gear 3 into the high speed gear 4.

The cam engaging pins are provided with substantially segmental notches 52 which permit the pins to straddle the operating rod 31, so that the operating rod will positively hold the pins against forward movement. The segmental notches of the operating rod 31 exert a certain cam action on the walls of the grooves 52, so that, in the second longitudinal movement of the operating rod, the pin 40 will be moved rearwardly out of contact with the cam and into a position where the longitudinal movement of the operating rod has carried the notch 36 beyond the pin 40, so that the pin 40 cannot again project into engagement with the cam until the operating rod 31 has been returned to a position with the notch 36 in proper registry with the pin 40.

The engagement of the pin 40 with the groove 44 of the cam 46 moves the cam rearwardly to a position in which the leading end of the cam groove 44 will be in position to receive the second cam engaging pin 41 when the second notch 37, through said additional longitudinal movement of the operating rod 31, is in register with the pin 41 and is adapted to permit the pin 41 to extend into the cam groove 44. The rearward movement of the cam by the first pin 40 shifts the pinion 1 from the low speed gear into mesh with the second speed gear 3, and the engagement of the second pin 41 with the cam groove 44 will effect a further movement of the cam and carry the pinion from the second speed gear 3 into mesh with the high speed gear 4.

The pinion 1 is carried from the high speed gear 4 to the second speed gear 3 by the pin 43 engaging the reversely arranged spiral cam groove 45, and the pin 43 engages the reversely arranged cam groove 45 for carrying the pinion 1 from the second speed gear 3 to the low speed gear 2. The centrifugal governor slides the operating rod 31 longitudinally to carry its notches into alignment with the cam engaging pins, and the slight rotary movement of the operating rod, necessary to arrange either the first pair of notches 36 and 37 or the second pair of notches 38 and 39 into position to cooperate with their respective pins, is effected by means of a guide 53 in a head or enlargement 54 of the operating rod 31 and a fixed projection 55 mounted on a cylindrical extension 56 of the guide 33. The fixed projection, which may consist of a pin or any other suitable fastening device, pierces the wall of the cylindrical extension 56 and extends into the guide 53 which is approximately diamond-shaped and is composed of two sides, each consisting of portions 57 and 58. The portion 57 of each side of the guide or way 53 is arranged in parallelism with the axis of the operating rod 31, and the portion 58 is arranged at an angle to the portion 57. The angularly disposed portions 58 of the sides of the guide 53 connect the parallel portions 57 and form a substantially diamond-shaped guide in which the fixed projection 53 operates. When the fixed projection is arranged in the parallel portion of one of the sides of the guide 53 and the operating rod 31 is moved longitudinally by the governor, the operating rod will be moved longitudinally and will be held against rotary movement until the fixed projection is caused to engage the angularly disposed portion of such side, and the fixed projection when operating in the angularly disposed portion will cause a partially rotary movement of the operating rod sufficient to bring one pair of the notches of the operating rod in position for use and to carry the other pair of notches out of position for use.

At the end of the partially rotary movement of the operating rod by reason of the fixed projection 55 reaching the end of such angularly disposed portion of the guide, the fixed projection will occupy a position at the outer end of the parallel portion of the other side of the guide, and, when the operating rod is moved longitudinally in a reverse direction, the fixed projection will ride in the parallel portion of the guide until it engages the angularly disposed portion of such side and will then cause a partial rotary movement of the operating rod. When the operating rod is moved in one direction by the governor, the fixed projection 55 will cooperate with one side of the substantially diamond-shaped guide, and when the operating rod is moved in the opposite direction, the fixed projection will cooperate with the other side of the guide 53. The parallel and angularly disposed portions of the guide will operate to cause the notches of the operating rod to be presented to the cam engaging pins in proper position to permit the pins to be projected by the springs 48 into engagement with the cam grooves of the cam.

In the normal operation of the automobile, the centrifugal governor is assisted by a piston 59 in actuating the sliding sleeve 25. The piston 59 operates in a cylinder 60, and its piston rod 61 is connected with the strap or collar 27 by a rod 62. The cylinder in advance of the piston is connected by a pipe 63 with the intake manifold 64 of the engine 65. By this means the governor is assisted in its action by the piston, so that, in the normal operation of the automobile or other motor vehicle, both the governor and the piston are required to shift the pinion 1 from one speed gear to another. Should, however, it be desired to continue operating a car either at low speed or when the car is in second speed, this may be accomplished by depressing the accelerator and feeding gas to the engine in a sufficient amount to eliminate temporarily suction sufficient to effect an operation of the piston. The governor then, unassisted by the piston, will be unable to shift the pinion 1 from one gear to another until it has attained sufficient centrifugal force through the speed of the automobile.

An automobile may be driven a considerable distance in either low speed or second speed before the velocity of the machine is sufficient to cause the governor to shift from one speed to the next higher speed. It will thus be seen that the piston is not absolutely necessary to the operation of the transmission by the governor, as the velocity of the car will eventually cause the centrifugal force of the governor to increase to such an extent that the governor will of itself operate the transmission. The two operating forces, the centrifugal force of the governor and the suction of the engine, are employed to enable the operator to delay action of the governor when it is desired or required in the normal operation of the car, and they render the transmission more flexible in the control of the car.

The drive shaft 6, which telescopes the tubular portion of the driven shaft 5, is provided at its rear end with an annular groove 66, which is engaged by a smooth portion 67 of a screw 68 or other suitable fastening device which is mounted on the cam and which extends through a longitudinal slot 69 in the tubular portion 7 of the driven shaft 5. The projecting portion 67 of the fastening device 68 holds the cam against rotation independently of the tubular portion of the driven shaft and causes the cam to rotate with the driven shaft and at the same time, by engaging the annular groove of the drive shaft, maintains the cam in a relatively fixed position with relation to the shiftable pinion 1 and also permits free rotary movement of the drive shaft. By maintaining the cam in fixed spaced relation with the pinion 1, the latter may be accurately controlled by the cam when shifting the pinion from one gear to another.

The cylindrical extension 56 of the guide 33 receives and guides the head or enlargement 54 of the operating rod, and, while it is shown integral with one end of the guide 33, it, of course, may be constructed in any suitable manner. Also the guide 33, which is oblong, may be mounted on and carried by any suitable support. Low speed gear 2 which has internal teeth is provided in its periphery with an annular groove 70, which coincides with an annular groove 71 arranged interiorly of the bearing 14 and cooperating with the annular groove 70 to form a race for antifriction balls 72, which, in practice, will be maintained in spaced relation by spacers of the ordinary construction. The bearings 15 and 16 for the low speed gear wheels 3 and 4 are also provided with annular grooves 73 and 74, which coincide with annular grooves 75 and 76 in the peripheries of the second speed gear 3 and the high speed gear 4 and which receive antifriction balls 77 and 78. The grooves of the bearings 15 and 16 and the gears 3 and 4 form races for the balls 75 and 76, which are also designed to be maintained in spaced relation by suitable spaces of the ordinary construction. Any other suitable antifriction means may be employed for peripherally mounting the gears 2, 3 and 4 for rotary movement in the housing or casing 17.

The gears 2, 3 and 4 and the pinion 1 are provided with teeth of the same size and pitch, and the gears which are connected with each other and with the driven shaft by the means hereinafter described rotate at the same speed, but, owing to the difference in diameters of the gears, the teeth travel at different speeds, and in order to enable the pinion to be shifted from one gear to another without liability of shearing or otherwise injuring the teeth of the pinion while it is being shifted from one gear to another, the gears are provided at their contiguous or adjacent faces with overlapping portions. The low speed gear 2 is provided at its inner or rear face with an arcuate recess 79 extending around nearly one-half of the gear wheel and forming or leaving an arcuate projecting portion 80 which fits in an arcuate recess 81 in the front adjacent face of the second speed gear 3. The arcuate recess 81 of the second speed gear 3 forms an arcuate projecting portion 82 which fits in the arcuate or segmental recess 79 of the low speed gear 2.

The second or low speed gear is provided at its rear face with an arcuate recess 83 forming an arcuate or segmental projecting portion 84 which fits within a corresponding recess 85 in the front face of the high speed gear 4. The recess 85 forms a curved projecting portion 86, which is received within the recess 83 in the rear face of the second speed gear wheel 3. The size or extent of the curved recesses and curved projecting portions may vary, and the terminals of the adjacent projecting portions of the gears are arranged out of contact or abutting relation with each other, so that in the operation of the transmission mechanism, no noise will result from the overlapping of the gears. The projecting or overlapping portions of the gears enable the pinion 1 to be shifted from one gear to another by the action of the cam without injury to either the teeth of the pinion or the teeth of the gears. The projecting overlapped portion of each gear is of a thickness slightly in excess of the thickness of the pinion, so that, during slightly more than one-half of the shifting movement of the pinion, the latter is in mesh with the projecting portion of the gear from which it is being shifted, and the transfer of the pinion from such gear to the adjacent gear is effected during the latter portion of the shifting movement and while the teeth of the adjacent gears coincide and do not in any way interfere with such shifting movement.

The gears 2, 3 and 4 are arranged off center with respect to one another and a portion of the inner circumference with the teeth thereof of all of the gears coincides with the curved plane of the outer portion of the pinion, and the cam and the cam engaging pins are so timed that the shifting of the pinion from one gear to another will be effected during the time the teeth of the gear from which the pinion is being shifted and the teeth of the gear to which the pinion is being shifted coincide.

The gears 2, 3 and 4 rotate at the same speed and bear a one-to-one ratio to one another. While the diameters of the gears may vary, the low speed gear may be provided with fifty-one teeth, the second gear with thirty-eight teeth, and the high speed gear with twenty-six teeth, while the pinion is provided with twenty-four teeth. By providing the low speed gear with an unequal number of teeth, the wear on the teeth will be distributed more uniformly than if the teeth of the low speed gear were an exact multiple of the number of teeth of the pinion, but the number of teeth and the size of the gear may be varied so long as the size and pitch of the teeth are maintained uniform.

In order to connect the gears 2, 3 and 4 with one another and maintain a one-to-one ratio of rotation, the low speed gear 2 is provided at its inner or rear face and the high speed gear is provided at its front face with spaced circular guideways 87 and 88, into which extend spaced pins 89 and 90 projecting from the front and rear faces of the second speed gear 3. The annular guideways 87 are disposed over the recess and the projecting portions of the rear face of the low speed gear 2 and the front face of the high speed gear 4, and, if desired, the projecting pins may be provided with any suitable antifriction means for eliminating, to a maximum extent, wear resulting from the pins operating in the annular ways which preferably consist of grooves.

The high speed gear 4 is also provided at its rear face, which is in the same plane throughout its entire extent, with spaced annular ways 91, into which project pins 92 extending from a disk or member 93 fixed to and rotating with the driven shaft. The disk 93 is secured to the front end of the tubular portion 7 of the driven shaft 5. When the pinion 1 is in mesh with any one of the gears 2, 3 and 4, rotary motion will be transmitted to the driven shaft at a speed proportional to the diameter of the pinion and the diameter of the gear with which the pinion is in mesh, and the other gears not in mesh with the pinion will rotate at the same speed as the gear with which the pinion is in mesh, by reason of the projecting pins and the annular guideways which produce a driving connection between the gears. The diameter of the circular guideways of the low and high speed gears is equal to the difference in the diameter of the gears at the teeth thereof.

The automatic variable speed transmission mechanism is equipped with means for enabling a car to be put in reverse. For this purpose the driven shaft is provided with sections 94 and 95 having telescoping portions 96 and 97 and provided with beveled gears 98 and 99, which are adapted to mesh with an intermediate gear 100 for reversing the rotation of the gear 98. The gears 98 and 99 are also equipped with clutch members 101 and 102, which are adapted to be moved into engagement for clutching relation with each other when the intermediate gear 100 is shifted out of mesh with the gears 98 and 99. This moving of the intermediate gear 100 into and out of mesh with the gears 88 and 89 and the simultaneous movement of the clutch members 101 and 102 out of engagement or into engagement with each other may be effected by any suitable means. In the drawings this operation is effected by an angular shifting lever 103 fulcrumed at its angle at 104 and provided with forked arms 105 and 106 which straddle the hubs of the gears 99 and 100 and engage annular grooves 107 and 108 in the hubs. The shifting lever 103 is provided with an operating arm 109, to which any suitable manually operable mechanism may be connected for enabling the operator of a car to separate the gears 98 and 99 and shift the intermediate gear 100 into mesh with the said gears. This will place the car or other motor vehicle in reverse.

While the automatic variable speed transmission mechanism is shown and described as applied to automobiles and other motor vehicles, the shifting mechanism and the gearing for transmitting motion from the drive shaft to the driven shaft may be advantageously employed in lathes and various other machines.

What is claimed is:

1. A variable speed transmission mechanism of the class described including a driving shaft having a pinion, a driven shaft, a plurality of gears of different diameters arranged to mesh with said pinion and to be actuated by the same for driving the driven shaft at different speeds, said gears having at their opposed faces overlapping portions bridging the gears and permitting shifting of the pinion from one gear to another without injuring the teeth of the pinion or the gears, means for coupling the gears with each other and with the driven shaft for enabling each gear when in mesh with the pinion to rotate the driven shaft at a speed in proportion to the ratio between the pinion and the gear in mesh with the same and for causing the other gears to rotate at the same speed as the gear in mesh with the pinion and maintaining the gears in permanent circumferential relation with one another whereby the bridging overlapping portions of the gears will be always maintained in proper position for the shifting of the pinion, and means for shifting the pinion from one gear to another.

2. A variable speed transmission mechanism of the class described including a driving shaft having a pinion, a driven shaft, a plurality of gears of different diameters arranged to mesh with said pinion and to be actuated by the same for driving the driven shaft at different speeds, said gears having at their opposed faces overlapping toothed portions constituting sections of the gears and permitting shifting of the pinion from one gear to another without injuring the teeth of the pinion or the gears, means for coupling the gears with each other and with the driven shaft for enabling each gear when in mesh with the pinion to rotate the driven shaft at a speed in proportion to the ratio between the pinion and the gear in mesh with the same and for causing the other gears to rotate at the same speed as the gear in mesh with the pinion and maintaining the gears in permanent circumferential relation with one another whereby the bridging overlapping portions of the gears will be always maintained in proper position for the shifting of the pinion, and means for shifting the pinion from one gear to another.

3. A variable speed transmission mechanism including a driving shaft having a pinion, a driven shaft, a plurality of gears of different diameters arranged to mesh with said pinion and to be actuated by the same for driving the driven shaft at different speeds, means for coupling the gears with each other and with the driven shaft for enabling each gear in mesh with the pinion to rotate the driven shaft at a speed in proportion to the ratio between the pinion and the gear in mesh with the same and for causing the gears to rotate at the same speed as the gear in mesh with the pinion and consisting of curved guiding means carried by one gear and a projecting element carried by the adjacent gear and operating in the curved guideway, and means for shifting the pinion from one gear to another.

4. A variable speed transmission mechanism including a driving shaft having a pinion, a driven shaft, a plurality of gears of different diameters arranged to mesh with said pinion and to be actuated by the same for driving the driven shaft at different speeds, means for coupling the gears with each other and with the driven shaft for enabling each gear in mesh with the pinion to rotate the driven shaft at a speed in proportion to the ratio between the pinion and the gear in mesh with the same and for causing the gears to rotate at the same speed as the gear in mesh with the pinion and consisting of circular guideways and cooperating projecting elements and disposed at intervals at the opposed faces of said gears, and means for shifting the pinion from one gear to another.

5. A variable speed transmission mechanism of the character described including a driving shaft having a pinion, a driven shaft, a plurality of internal gears eccentrically arranged and having portions of their toothed inner peripheries coinciding and provided with overlapping portions bridging the gears and adapted to permit the pinion to be shifted from one gear to another without injuring the teeth of the pinion or the gears, means for coupling the gears with each other and with the driven shaft for enabling each gear when in mesh with the pinion to rotate the driven shaft at a speed in proportion to the ratio between the pinion and the gear in mesh with it and for causing the other gears to rotate at the same speed as the gear in mesh with the pinion, whereby the toothed overlapping bridging portions of the gears will be permanently maintained in proper position with relation to the gears for the shifting of the pinion, and means for shifting the pinion from one gear to another.

6. A variable speed transmission mechanism of the character described including a driving shaft having a pinion, a driven shaft, a plurality of internal gears eccentrically arranged and having portions of their toothed inner peripheries coinciding and provided with overlapping portions bridging the gears and adapted to permit the pinion to be shifted from one gear to another without injuring the teeth of the pinion or the gears, said gears being provided at their outer peripheries with annular grooves, bearings for the gears having annular grooves coacting with the grooves of the gears to form races, antifriction devices arranged in said races, means for coupling the gears with each other and with the driven shaft for enabling each gear when in mesh with the pinion to rotate the driven shaft at a speed in proportion to the ratio between the pinion and the gear in mesh with it and for causing the other gears to rotate at the same speed as the gear in mesh with the pinion, whereby the toothed overlapping bridging portions of the gears will be permanently maintained in proper position with relation to the gears for the shifting of the pinion, and means for shifting the pinion from one gear to another.

7. A variable speed transmission mechanism including a driving shaft having a pinion, a driven shaft, a plurality of gears of different diameters arranged to mesh with said pinion and to be actuated by the same for driving the driven shaft at different speeds, means for coupling the gears with each other and with the driven shaft, and means for shifting the pinion from one gear to another comprising a cam having reversely arranged spiral grooves and connected with said pinion, spaced pins arranged in pairs and movable to engage the grooves of the cam for causing a sliding movement thereof to shift the pinion from one gear to another, an operating member having means spaced longitudinally and circumferentially for controlling the operation of the pins, a governor actuated by the speed of a vehicle, and means for connecting the governor with said operating member for imparting sliding and rotary movements to the same.

8. A variable speed transmission mechanism including a driving shaft having a pinion, a driven shaft, a plurality of gears of different diameters arranged to mesh with said pinion and to be actuated by the same for driving the driven shaft at different speeds, means for coupling the gears with each other and with the driven shaft, and means for shifting the pinion from one gear to another comprising a cam having reversely arranged spiral grooves and connected with said pinion, spaced pins arranged in pairs and movable to engage the grooves of the cam for causing a sliding movement thereof to shift the pinion from one gear to another, an operating member having means spaced longitudinally and circumferentially for controlling the operation of the pins, a governor actuated by the speed of a vehicle, means for connecting the governor with said operating member for imparting sliding and rotary movements to the same, said means including a guide having laterally spaced portions arranged in parallelism with the axis of the driven shaft and angular portions connecting the parallel portions with each other, and an element operating in the guide for permitting sliding movement of said member and for causing a limited rotary movement of the same.

9. A variable speed transmission mechanism of the character described including a driven shaft having a tubular portion provided with a longitudinal slot, a drive shaft extending into the tubular portion of the driven shaft and having an annular groove, a pinion fixed to the driving shaft, a cam slidable on the tubular portion of the driven shaft and having means extending through the slot thereof and engaging the annular groove of the driving shaft for connecting the cam with the same for causing the cam and the pinion to slide in unison when the cam is actuated, a plurality of gears of different diameters arranged in mesh with said pinion and to be actuated by the same for rotating the driven shaft at different speeds, means for coupling the gears with each other and with the driven shaft for enabling each gear when in mesh with the pinion to rotate the driven shaft at a speed in proportion to the ratio between the pinion and the gear in mesh with it and for causing the other gears to rotate at the same speed as the gear in mesh with the pinion, and means cooperating with the cam for causing a sliding movement thereof to shift the pinion from one gear to another.

10. In a variable speed transmission, a casing, a driving shaft rotatably mounted for shifting movement in the casing, a driven shaft rotatably mounted in the casing, a plurality of gears carried by the driven shaft, a pinion mounted on the driving shaft for shifting movement therewith and designed upon shifting thereof for movement from a neutral position to positions of selective engagement with said gears, a collar carried by the pinion, a manually operable and movable shifting fork pivoted to the casing and having bifurcations normally straddling the collar in the neutral position of the pinion, means controlled by the speed of rotation of the driven shaft for automatically shifting the pinion to positions of selective engagement with said gears, and means operable upon movement of the shifting fork for delivering the pinion from its neutral position to a position of engagement with one of the gears on the driven shaft, one of said furcations on the shifting fork being shorter than the other furcation whereby the collar is released by the fork when the former is delivered to said specified gear.

11. In a variable speed transmission, a casing, a driving shaft rotatably mounted for shifting movement in the casing, a driven shaft rotatably mounted in the casing, a plurality of gears carried by the driven shaft, a pinion mounted on the driving shaft for shifting movement therewith and designed upon shifting thereof for movement from a neutral position to positions of selective engagement with said gears, a manually operable shifting element pivoted to the casing and cooperating with the pinion for shifting the same, means controlled by the speed of rotation of the driven shaft for automatically shifting the pinion to positions of selective engagement with said gears, and means operable upon movement of the shifting element for delivering the pinion from its neutral position to a position of engagement with one of said gears and for releasing the pinion in such position of engagement.

PETER W. KANE.